(12) United States Patent
Noble et al.

(10) Patent No.: US 12,164,041 B2
(45) Date of Patent: Dec. 10, 2024

(54) SYSTEMS AND METHODS FOR DISTRIBUTED DENSE NETWORK PROCESSING OF SATELLITE POSITIONING DATA

(71) Applicant: Swift Navigation, Inc., San Francisco, CA (US)

(72) Inventors: Fergus Noble, San Francisco, CA (US); Anthony Cole, San Francisco, CA (US)

(73) Assignee: Swift Navigation, Inc., San Francisco, CA (US)

( * ) Notice: Subject to any disclaimer, the term of this patent is extended or adjusted under 35 U.S.C. 154(b) by 0 days.

(21) Appl. No.: 18/210,455

(22) Filed: Jun. 15, 2023

(65) Prior Publication Data

US 2023/0341560 A1 Oct. 26, 2023

Related U.S. Application Data

(63) Continuation of application No. 17/347,874, filed on Jun. 15, 2021, now Pat. No. 11,714,196, which is a (Continued)

(51) Int. Cl.
*G01S 19/00* (2010.01)
*G01S 19/04* (2010.01)
(Continued)

(52) U.S. Cl.
CPC ............ *G01S 19/072* (2019.08); *G01S 19/04* (2013.01); *G01S 19/06* (2013.01); *G01S 19/07* (2013.01); *G01S 19/256* (2013.01); *G01S 19/40* (2013.01)

(58) Field of Classification Search
CPC ........ G01S 19/072; G01S 19/04; G01S 19/07; G01S 19/256; G01S 19/40
(Continued)

(56) References Cited

U.S. PATENT DOCUMENTS 5,490,076 A 2/1996 Rawicz et al.
5,610,614 A 3/1997 Talbot et al.
(Continued)

FOREIGN PATENT DOCUMENTS

AU 2007300586 A1 4/2008
CA 2718988 C 1/2014
(Continued)

OTHER PUBLICATIONS

Abdel-Hafez, M. F., "A High-Integrity and Efficient GPS Integer Ambiguity Resolution Method", Navigation: Journal of The Institute of Navigation, vol. 50(4), p. 295-310, Winter 2003-2004 (Year: 2004).
(Continued)

*Primary Examiner* — Harry K Liu
(74) *Attorney, Agent, or Firm* — Jeffrey Schox; Randy Mehlenbacher

(57) ABSTRACT

A system for generating satellite positioning corrections includes a global correction module that generates a set of global pre-corrections based on modeling of global positioning error, a set of local correction modules that, for each local correction module of the set, takes input from a unique reference source and generates a set of local pre-corrections based on modeling of local positioning error; and a correction generator that generates a positioning correction from the set of global pre-corrections and the sets of local pre-corrections to correct a position of the mobile receiver.

24 Claims, 4 Drawing Sheets

Related U.S. Application Data continuation of application No. 16/589,932, filed on Oct. 1, 2019, now Pat. No. 11,061,141, which is a continuation of application No. 16/195,427, filed on Nov. 19, 2018, now Pat. No. 10,473,790.

(60) Provisional application No. 62/587,741, filed on Nov. 17, 2017.

(51) Int. Cl.
 *G01S 19/06* (2010.01)
 *G01S 19/07* (2010.01)
 *G01S 19/25* (2010.01)
 *G01S 19/40* (2010.01)

(58) Field of Classification Search
 USPC .................................................. 342/357.44
 See application file for complete search history.

(56) References Cited

U.S. PATENT DOCUMENTS

| | | |
|---|---|---|
| 6,427,122 B1 | 7/2002 | Lin |
| 6,453,237 B1 | 9/2002 | Fuchs et al. |
| 6,552,680 B1 | 4/2003 | Barber et al. |
| 6,647,340 B1 | 11/2003 | Pemble et al. |
| 6,691,066 B1 | 2/2004 | Brodie |
| 6,727,849 B1 | 4/2004 | Kirk et al. |
| 6,753,810 B1 | 6/2004 | Yang et al. |
| 6,816,117 B2 | 11/2004 | Fink et al. |
| 6,856,905 B2 | 2/2005 | Pasturel et al. |
| 6,864,836 B1 | 3/2005 | Hatch et al. |
| 7,026,982 B2 | 4/2006 | Toda et al. |
| 7,158,885 B1 | 1/2007 | Janky et al. |
| 7,219,013 B1 | 5/2007 | Young et al. |
| 7,289,061 B2 | 10/2007 | Komjathy et al. |
| 7,292,183 B2 | 11/2007 | Bird et al. |
| 7,298,325 B2 | 11/2007 | Krikorian et al. |
| 7,382,313 B1 | 6/2008 | Goad |
| 7,409,289 B2 | 8/2008 | Coatantiec et al. |
| 7,538,721 B2 | 5/2009 | Vollath et al. |
| 7,692,578 B2 | 4/2010 | Vollath et al. |
| 7,696,922 B2 | 4/2010 | Nicholson et al. |
| 8,089,402 B2 | 1/2012 | Maenpa et al. |
| 8,094,065 B2 | 1/2012 | Henkel |
| 8,134,497 B2 | 3/2012 | Janky et al. |
| 8,193,976 B2 | 6/2012 | Shen et al. |
| 8,255,155 B1 | 8/2012 | Crane et al. |
| 8,416,133 B2 | 4/2013 | Hatch et al. |
| 8,447,517 B2 | 5/2013 | Roh |
| 8,542,146 B2 | 9/2013 | Vollath |
| 8,587,475 B2 | 11/2013 | Leandro |
| 8,610,624 B2 | 12/2013 | Savoy |
| 8,756,001 B2 | 6/2014 | Georgy et al. |
| 8,760,343 B2 | 6/2014 | Milyutin et al. |
| 8,825,456 B2 | 9/2014 | Vasudevan et al. |
| 8,860,609 B2 | 10/2014 | Roh |
| 8,996,311 B1 | 3/2015 | Morin et al. |
| 9,031,782 B1 | 5/2015 | Lemay et al. |
| 9,069,073 B2 | 6/2015 | Ramakrishnan et al. |
| 9,128,176 B2 | 9/2015 | Seeger |
| 9,182,497 B2 | 11/2015 | Geier et al. |
| 9,405,012 B2 | 8/2016 | Doucet et al. |
| 9,405,016 B2 | 8/2016 | Yim |
| 9,417,330 B2 | 8/2016 | Revol et al. |
| 9,557,422 B1 | 1/2017 | Miller et al. |
| 9,568,321 B2 | 2/2017 | Bharadwaj et al. |
| 9,576,082 B2 | 2/2017 | Sparks et al. |
| 9,602,974 B2 | 3/2017 | Rudow et al. |
| 9,612,341 B2 | 4/2017 | Large et al. |
| 9,671,501 B2 | 6/2017 | Leandro et al. |
| 9,709,683 B2 | 7/2017 | Leandro et al. |
| 9,784,844 B2 | 10/2017 | Kana et al. |
| 9,857,474 B2 | 1/2018 | Tan et al. |
| 9,927,530 B2 | 3/2018 | Boyarski |
| 9,933,528 B2 | 4/2018 | Horn et al. |
| 10,018,729 B2 | 7/2018 | Dunik et al. |
| 10,101,464 B2 | 10/2018 | Appleford et al. |
| 10,191,157 B2 | 1/2019 | Dai et al. |
| 10,260,888 B2 | 4/2019 | Takahashi |
| 10,274,606 B1 | 4/2019 | Phan et al. |
| 10,422,885 B2 | 9/2019 | Dai et al. |
| 10,459,593 B2 | 10/2019 | Tiwari et al. |
| 10,473,790 B2 | 11/2019 | Noble et al. |
| 10,578,747 B2 | 3/2020 | Grgich et al. |
| 10,677,933 B1 | 6/2020 | Gavrilets et al. |
| 10,802,160 B2 | 10/2020 | Dai et al. |
| 10,809,388 B1 | 10/2020 | Carcanague et al. |
| 10,901,096 B2 | 1/2021 | Thrasher et al. |
| 11,131,774 B2 | 9/2021 | Miya et al. |
| 11,143,762 B2 | 10/2021 | Takahashi et al. |
| 11,156,718 B2 | 10/2021 | Takeda |
| 11,187,813 B2 | 11/2021 | Brandl et al. |
| 11,221,418 B2 | 1/2022 | Sleewaegen et al. |
| 11,237,276 B2 | 2/2022 | Kleeman |
| 11,259,141 B2 | 2/2022 | Li et al. |
| 11,327,182 B2 | 5/2022 | Zalewski et al. |
| 11,333,772 B2 | 5/2022 | Del Regno et al. |
| 11,378,699 B2 | 7/2022 | Segal et al. |
| 11,422,269 B2 | 8/2022 | Ookubo et al. |
| 11,422,271 B2 | 8/2022 | Talbot et al. |
| 11,624,838 B2 | 4/2023 | Fine et al. |
| 11,693,120 B2 | 7/2023 | Angelo et al. |
| 11,953,608 B2 * | 4/2024 | Hamada .................. G01S 19/07 |
| 2002/0180641 A1 | 12/2002 | Fink et al. |
| 2005/0001762 A1 | 1/2005 | Han et al. |
| 2005/0001763 A1 | 1/2005 | Han et al. |
| 2005/0024263 A1 | 2/2005 | Sharpe et al. |
| 2005/0114023 A1 | 5/2005 | Williamson et al. |
| 2005/0203702 A1 | 9/2005 | Sharpe et al. |
| 2007/0055445 A1 | 3/2007 | Janky et al. |
| 2007/0126629 A1 | 6/2007 | Krikorian et al. |
| 2008/0205521 A1 | 8/2008 | Van |
| 2009/0018772 A1 | 1/2009 | Watanabe et al. |
| 2009/0184869 A1 | 7/2009 | Talbot et al. |
| 2009/0224969 A1 | 9/2009 | Kolb |
| 2009/0262013 A1 | 10/2009 | Vollath |
| 2009/0273511 A1 | 11/2009 | Schroth |
| 2010/0033370 A1 | 2/2010 | Lopez et al. |
| 2010/0164789 A1 | 7/2010 | Basnayake |
| 2010/0283675 A1 | 11/2010 | McAree et al. |
| 2011/0050497 A1 | 3/2011 | Maenpa et al. |
| 2011/0090116 A1 | 4/2011 | Hatch et al. |
| 2011/0122022 A1 | 5/2011 | Van et al. |
| 2011/0140959 A1 | 6/2011 | Vollath |
| 2011/0148698 A1 | 6/2011 | Vollath |
| 2011/0187589 A1 | 8/2011 | Gaal et al. |
| 2011/0187590 A1 | 8/2011 | Leandro |
| 2011/0316740 A1 | 12/2011 | Waters et al. |
| 2012/0050097 A1 | 3/2012 | Zhang et al. |
| 2012/0146847 A1 | 6/2012 | Janky et al. |
| 2012/0154210 A1 | 6/2012 | Landau et al. |
| 2012/0154214 A1 | 6/2012 | Leandro |
| 2012/0154215 A1 | 6/2012 | Vollath et al. |
| 2012/0173195 A1 | 7/2012 | Opshaug et al. |
| 2012/0176271 A1 | 7/2012 | Dai et al. |
| 2012/0286991 A1 | 11/2012 | Chen et al. |
| 2013/0050020 A1 | 2/2013 | Peck et al. |
| 2013/0099970 A1 | 4/2013 | Lin et al. |
| 2013/0227377 A1 | 8/2013 | Rao et al. |
| 2013/0234885 A1 | 9/2013 | Geier et al. |
| 2013/0251150 A1 | 9/2013 | Chassagne |
| 2013/0265191 A1 | 10/2013 | Ghinamo |
| 2013/0271318 A1 | 10/2013 | Landau et al. |
| 2013/0335264 A1 | 12/2013 | Revol et al. |
| 2014/0002300 A1 | 1/2014 | Leandro et al. |
| 2014/0015712 A1 | 1/2014 | Leandro et al. |
| 2014/0062765 A1 | 3/2014 | Brenner |
| 2014/0062776 A1 | 3/2014 | Ferguson et al. |
| 2014/0077991 A1 | 3/2014 | Bar-Sever et al. |
| 2014/0184442 A1 | 7/2014 | Large et al. |
| 2014/0232592 A1 | 8/2014 | Psiaki et al. |
| 2014/0240172 A1 | 8/2014 | Milyutin et al. |
| 2014/0266876 A1 | 9/2014 | Tan et al. |

(56) References Cited

U.S. PATENT DOCUMENTS

| | | |
|---|---|---|
| 2014/0288825 A1 | 9/2014 | Czompo et al. |
| 2015/0019464 A1 | 1/2015 | Nguyen-Tuong et al. |
| 2015/0168559 A1 | 6/2015 | Salazar et al. |
| 2015/0173037 A1 | 6/2015 | Pijl |
| 2015/0260848 A1 | 9/2015 | Mundt et al. |
| 2015/0270615 A1 | 9/2015 | Neenan |
| 2015/0293230 A1 | 10/2015 | Weed et al. |
| 2015/0293233 A1 | 10/2015 | De Jong |
| 2015/0369924 A1 | 12/2015 | Hedgecock et al. |
| 2016/0011318 A1 | 1/2016 | Cohen |
| 2016/0097859 A1 | 4/2016 | Hansen et al. |
| 2016/0116601 A1 | 4/2016 | Horn et al. |
| 2016/0195617 A1 | 7/2016 | Phatak et al. |
| 2016/0373263 A1 | 12/2016 | Zaidi et al. |
| 2017/0254904 A1 | 9/2017 | Zhodzishsky et al. |
| 2017/0269216 A1 | 9/2017 | Dai et al. |
| 2017/0269222 A1 | 9/2017 | Dai et al. |
| 2017/0269227 A1 | 9/2017 | Dai et al. |
| 2017/0269231 A1 | 9/2017 | Dai et al. |
| 2017/0299730 A1 | 10/2017 | Lie et al. |
| 2017/0299731 A1 | 10/2017 | Lie et al. |
| 2017/0322313 A1 | 11/2017 | Revol et al. |
| 2018/0113219 A1 | 4/2018 | Wuebbena |
| 2018/0120445 A1 | 5/2018 | Dill |
| 2018/0164442 A1 | 6/2018 | Thrasher et al. |
| 2018/0172838 A1 | 6/2018 | Junker et al. |
| 2018/0188032 A1 | 7/2018 | Ramanandan et al. |
| 2018/0246217 A1 | 8/2018 | Wuebbena |
| 2018/0252818 A1 | 9/2018 | Sato et al. |
| 2018/0283882 A1 | 10/2018 | He et al. |
| 2018/0299562 A1 | 10/2018 | Green |
| 2018/0306930 A1 | 10/2018 | Laine et al. |
| 2019/0004180 A1 | 1/2019 | Jokinen |
| 2019/0078895 A1 | 3/2019 | Ma et al. |
| 2019/0120970 A1 | 4/2019 | Mgen et al. |
| 2019/0154837 A1 | 5/2019 | Noble et al. |
| 2019/0187295 A1 | 6/2019 | Lee et al. |
| 2019/0187298 A1 | 6/2019 | Grgich et al. |
| 2019/0204450 A1 | 7/2019 | Revol |
| 2019/0243001 A1 | 8/2019 | Ookubo et al. |
| 2019/0302274 A1 | 10/2019 | Berntorp et al. |
| 2019/0339396 A1 | 11/2019 | Turunen |
| 2019/0369265 A1 | 12/2019 | Jokinen |
| 2019/0383948 A1 | 12/2019 | Hoeferlin et al. |
| 2020/0025936 A1 | 1/2020 | Zhou et al. |
| 2020/0025937 A1 | 1/2020 | Kroeger et al. |
| 2020/0041654 A1 | 2/2020 | Noble et al. |
| 2020/0041658 A1 | 2/2020 | Laurichesse |
| 2020/0084586 A1 | 3/2020 | Rydén et al. |
| 2020/0096649 A1 | 3/2020 | Brandl et al. |
| 2020/0209406 A1 | 7/2020 | Lin et al. |
| 2020/0233056 A1 | 7/2020 | Dolgov et al. |
| 2020/0257002 A1 | 8/2020 | Henkel |
| 2020/0408926 A1 | 12/2020 | Carcanague et al. |
| 2021/0033735 A1 | 2/2021 | Kleeman |
| 2021/0116579 A1 | 4/2021 | Rezaei |
| 2021/0141099 A1 | 5/2021 | Gunnarsson et al. |
| 2021/0165104 A1 | 6/2021 | Zalewski et al. |
| 2021/0165111 A1 | 6/2021 | Zalewski |
| 2021/0215831 A1 | 7/2021 | Takeda |
| 2021/0333413 A1 | 10/2021 | Zyryanov |
| 2021/0372793 A1 | 12/2021 | Nikulin et al. |
| 2022/0011443 A1 | 1/2022 | De Wilde et al. |
| 2022/0018969 A1 | 1/2022 | Fine et al. |
| 2022/0057523 A1 | 2/2022 | Lee |
| 2022/0058322 A1 | 2/2022 | Brandl et al. |
| 2022/0107427 A1 | 4/2022 | Kleeman et al. |
| 2022/0163677 A1 | 5/2022 | Muthuraman et al. |
| 2022/0171053 A1 | 6/2022 | Park et al. |
| 2022/0317310 A1 | 10/2022 | He et al. |
| 2023/0140535 A1 | 5/2023 | Ma et al. |
| 2023/0184956 A1 | 6/2023 | Cole et al. |

FOREIGN PATENT DOCUMENTS

| | | | | |
|---|---|---|---|---|
| CA | 3079279 A1 | 10/2020 | | |
| CN | 101166995 A | 4/2008 | | |
| CN | 103197327 A | 7/2013 | | |
| CN | 103760573 A | 4/2014 | | |
| CN | 104236522 A | 12/2014 | | |
| CN | 104732085 A | 6/2015 | | |
| CN | 106338738 A | * 1/2017 | ............ | G01S 19/07 |
| CN | 106970404 A | 7/2017 | | |
| CN | 107085626 A | 8/2017 | | |
| CN | 108196272 A | 6/2018 | | |
| CN | 108317949 A | 7/2018 | | |
| CN | 108536003 A | 9/2018 | | |
| CN | 105629263 B | 4/2019 | | |
| CN | 107422354 B | 6/2019 | | |
| CN | 111272174 A | 6/2020 | | |
| CN | 111879545 A | 11/2020 | | |
| CN | 109714421 B | 8/2021 | | |
| CN | 114174850 A | 3/2022 | | |
| DE | 102017212603 A1 | 1/2019 | | |
| DE | 102018202223 A1 | 8/2019 | | |
| EP | 0244091 A2 | 11/1987 | | |
| EP | 0940945 A2 | 9/1999 | | |
| EP | 1729145 A1 | 12/2006 | | |
| EP | 2128841 A1 | 12/2009 | | |
| EP | 2602752 A1 | 6/2013 | | |
| EP | 1839070 B2 | 4/2014 | | |
| EP | 2966477 A1 | 1/2016 | | |
| EP | 2995975 A1 | * 3/2016 | ........... | G01S 19/072 |
| EP | 3035080 A1 | * 6/2016 | ........... | G01S 19/072 |
| EP | 3627188 A1 | 3/2020 | | |
| EP | 3566021 B1 | 3/2021 | | |
| EP | 3828595 A1 | 6/2021 | | |
| EP | 3963352 A1 | 3/2022 | | |
| KR | 101181990 B1 | 9/2012 | | |
| WO | 02061449 A1 | 8/2002 | | |
| WO | 2017046914 A1 | 3/2017 | | |
| WO | 2017070732 A1 | 5/2017 | | |
| WO | 2018188845 A1 | 10/2018 | | |
| WO | 2019063645 A1 | 4/2019 | | |
| WO | 2020240307 A1 | 12/2020 | | |

OTHER PUBLICATIONS

Bijl, Hildo, et al., "Online sparse Gaussian process regression using FITC and PITC approximations", IFAG-Papers On Line vol. 48, Issue 28, 2015, pp. 703-708 (Year: 2015).

Brocard, Philippe, et al., "System and Method for Distributed Integrity Monitoring", U.S. Appl. No. 18/491,167, filed Oct. 20, 2023.

Cole, D.A., et al., "Locally induced Gaussian processes for large-scale simulation experiments", Stat Comput 31, 33 (2021). https://doi.org/10.1007/s11222-021-10007-9 (Year: 2021).

Erickson, Collin B., et al., "Comparison of Gaussian Process Modeling Software", European Journal of Operational Research 266 (2018) 179-192 (Year: 2018).

Inyurt, Samed, et al., "Ionospheric TEC Forecasting Using Gaussian Process Regression (GPR) and multiple Linear Regression (M LR) in X Turkey", Astrophys Space Sci (2020) 365:99, https://doi.org/10.1007 / s10509-020-03817-2 (Year: 2020).

Lin, Ming, et al., "Robust Gaussian Process Regression for Real-Time High Precision GPS Signal Enhancement", Applied Data Science Track Paper. KDD '19, Aug. 4-8, 2019, Anchorage, AK, USA (Year: 2019).

Mobarak, Jason, et al., "System and Method for GNSS Correction Transmission", U.S. Appl. No. 18/244,567, filed Sep. 11, 2023.

Parkins, Alex, et al., "System and Method for GNSS Correction Monitoring", U.S. Appl. No. 18/503,662, filed Nov. 7, 2023.

Quinonero-Candel, Joaquin, et al., "A Unifying View of Sparse Approximate Gaussian Progress Regression", Journal of Machine Learning Research 6 (2005) 1939-1959. (Year: 2005).

Sleewaegen, Jean-Marie, et al., "Galileo E5b Rover Receiving E5a Corrections? No Problem!", 32nd International Technical Meeting of the Satellite Division of the Institute of Navigation (ION GNSS+ 2019), Miami, Florida, Sep. 16-20, 2019.

(56) References Cited

OTHER PUBLICATIONS

Smolyakov, Ivan, et al., "System and Method for Determining GNSS Corrections", U.S. Appl. No. 18/241,542, filed Sep. 1, 2023.
Subirana, J. S., "Combination of GNSS Measurements, Navipedia", https://gssc.esa.int/navipedia/index.php?title=Combination_of_GNSS_Measurements (Year: 2011).
Yang, Y., et al., "L1 Backup Navigation for Dual Frequency GPS Receiver", Proceedings of the 16th International Technical Meeting of the Satellite Division of The Institute of Navigation (ION GPS/GNSS 2003), Portland, OR,. Sep. 2003, pp. 1258-1263.
Ibrahim, Hassan E., et al., "A Regional Stochastic Model for NOAA-Based Residual Tropospheric Delay", ION NTM 2008, Jan. 28-30, 2008, San Diego, CA.
Wubbena, Gerhard, et al., "RTK Networks based on Geo++ GNSMART—Concepts, Implementation, Results", ION GPS 2001, Sep. 11-14, 2001, Salt Lake City, UT.
"Road vehicles Functional safety Part 1: Vocabulary", ISO 26262-1:2018, https://www.iso.org/standard/68383.html, Abstract, published Dec. 2018.
"The First in China | Bynav Alice GNSS SOC Awarded ISO 26262 ASIL B Functional Safety Product Certification", Gasgoo, https://autonews.gasgoo.com/m/70028360.html, Sep. 22, 2023.
Brocard, Philippe, et al., "System and Method for Bounding a Satellite Positioning Solution Integrity", U.S. Appl. No. 18/537,212, filed Dec. 12, 2023.
Chen, Liang, et al., "GNSS High-Precision Augmentation for Autonomous Vehicles: Requirements, Solution, and Technical Challenges", Remote Sens. 2023, 15, 1623. https://doi.org/ 10.3390/rs15061623.
George, Jitin, "C2000 MCU SafeTI control solutions: An introduction to ASIL decomposition and SIL synthesis", Texas Instruments, Apr. 2019.
Nathan, Aaron, "Point One Navigation Launches ASIL Positioning Engine to Enable Safe and Precise Autonomous Vehicles", Point One Navigation, Dec. 19, 2022, https://pointonenav.com/news/point-one-navigation-launches-asil-positioning-engine/.
Ward, D. D., et al., "The Uses and Abuses of ASIL Decomposition in ISO 26262", 7th IET International Conference on System Safety, incorporating the Cyber Security Conference 2012.
Schmitz, Martin, "RTCM State Space Representation Messages, Status and Plans", PPP-RTK & Open Standards Symposium, Mar. 12-13, 2012, Frankfurt, Germany.
Shapiro, Larry S., et al., "Rejecting Outliers and Estimating Errors in an Orthogonal-Regression Framework", Phil. Trans. R. Soc. Load. A (1995)350, 407-439. (Year: 1995).
Skog, Isaac, et al., "A Low-Cost GPS Aided Inertial Navigation System for Vehicle Applications", 2005 13th European Signal Processing Conference, Sep. 4-8, 2005.
Snelson, Edward, et al., "Sparse Gaussian Process using Pseudo-inputs", NIPS'05: Proceedings of the 18th International Conference on Neural Information Processing Systems, Dec. 2005, pp. 1257-1264.
Subirana, J. Sanz, et al., "Carrier Phase Cycle-Slip Detection—Navipedia", https://gssc.esa.int/navipedia/index.php/Carrier_Phase_Cycle-Slip_Detection, published 2011.
Takasu, Tomoji, et al., "ION GNSS 2008 abstract submission Cycle slip detection and fixing by MEMS IMU/GPS Integration for mobile environment RTK-GPS", Tokyo University of Marine Science and Technology, ION GNSS 2008, abstract submission.
Takenaka, et al., "Geolocation Correction for Geostationary Satellite Observations by a Phase-Only Correlation Method Using a Visible Channe", MPDI, Aug. 1, 2020, retrieved on Oct. 3, 2023. Retrieved from the internet <URL: http://www.mdpi.com/2072-4292/12/15/2472>.
Tanedo, Flip, "Notes on non-holonomic constraints", For P3318, Spring 2013, https://www.physics.uci.edu/~tanedo/files/teaching/P3318S13/Sec_05_nonholonomic.pdf.
Teunissen, P.J.G., "GNSS Integer Ambiguity Validation: Overview of Theory and Methods", Proceedings of the ION 2013 Pacific PNT Meeting, Apr. 23-25, 2013, Marriott Waikiki Beach Resort & Spa, Honolulu, Hawaii, https://www.ion.org/publications/abstract.cfm?articleID=11030.
Teunissen, Peter J.G., et al., "Integer Aperture Estimation A Framework for GNSS Ambiguity Acceptance Testing", InsideGNSS, Mar./Apr. 2011, pp. 66-73, www.insidegnss.com.
Teunissen, P.J.G., "On the GPS widelane and its decorrelating property", Delft Geodetic Computing Centre, Journal of Geodesy (1997) 71: 577-587.
Thombre, Sarang, et al., "GNSS Threat Monitoring and Reporting: Past, Present, and a Proposed Future", The Journal of Navigation, Dec. 2017, DOI: 10.1017/S0373463317000911, https://www.researchgate.net/publication/321663256.
Titsias, Michael K., "Variational Learning of Inducing Variables in Sparse Gaussian Processes", http://proceedings.mlr.press/v5/titsias09a/titsias09a.pdf, 2009.
Urquhart, Landon, "An Analysis of Multi-Frequency Carrier Phase Linear Combinations for GNSS", Department of Geodesy and Geomatics Engineering, University of New Brunswick, Technical Report No. 263, Feb. 2009.
Urquhart, Landon, et al., "Innovation: Integrity for safe navigation", https://www.gpsworld.com/innovation-integrity-for-safe-navigation-provided-by-gnss-service/, GPS World, Feb. 12, 2020.
Van Diggelen, Frank, et al., "Google to improve urban GPS accuracy for apps", Dec. 9, 2020, Android Developers Blog.
Van Graas, Frank, et al., "Precise Velocity Estimation Using a Stand-Alone GPS Receiver", Abstract only, Journal of The Institute of Navigation, vol. 51, No. 4, Winter 2004-2005, pp. 283-292, https://www.ion.org/publications/abstract.cfm?articleID=102384.
Verhagen, S., "The GNSS integer ambiguities: Estimation and validation", Aerospace Engineering, Jan. 31, 2005.
Waserman, Eyal, et al., "A Mixed Integer Least-Squares Formulation of the GNSS Snapshot Positioning Problem", https://github.com/eyalw711/snapshot-positioning, Jun. 2, 2021.
Won, Dachee, et al., "Performance Improvement of Inertial Navigation System by Using Magnetometer with Vehicle Dynamic Constraints", Hindawi, vol. 2015 | Article ID 435062 | https://doi.org/10.1155/2015/435062, https://www.hindawi.com/journals/js/2015/435062/.
Wubbena, Gerhard, et al., "PPP-RTK: Precise Point Positioning Using State-Space Representation in RTK Networks", Presented at the 18th International Technical Meeting, ION GNSS-05, Sep. 13-16, 2005, Long Beach, California.
Yang, Wenhao, et al., "An Improved Relative GNSS Tracking Method Utilizing Single Frequency Receivers", Sensors 2020, 20, 4073; doi:10.3390/s20154073 www.mdpi.com/journal/sensors, 19 pages.
Zhu, Ni, et al., "GNSS Position Integrity in Urban Environments: A Review of Literature", IEEE Transactions on Intelligent Transportation Systems, 2018, 17p., 10.1109/TITS.2017.2766768.hal-01709519.
"An Introduction to GNSS, Chapter 4, GNSS Error Sources", https://novatel.com/an-introduction-to-gnss/chapter-4-gnsserrorsources, published 2015.
"Geo++ SSR For Network-RTK, PPP and PPP-RTK", https://geopp.de/wp-content/uploads/2020/09/SSR_Flyer_v3.pdf, Sep. 2015.
"IGS State Space Representation (SSR) Format Version 1.00", International GNSS Service (IGS), Oct. 5, 2020.
"Integrity-Navipedia", https://gssc.esa.int/navipedia/index.php/Integrity, published 2011.
"Phase II of the GNSS Evolutionary Architecture Study", https://www.faa.gov/about/office_org/headquarters_offices/ato/service_units/techops/navservices/gnss/library/documents/media/geasphaseii_final.pdf, Feb. 2010.
"RAIM", GMV, 2011, RAIM.
"Safe Position Augmentation for Real-Time Navigation (SPARTN) Interface Control Document Version 1.8.0", Jan. 2020, Sapcorda Services GmbH.
"Swift Navigation Binary Protocol", Version 3.4.5, Mar. 10, 2021, pp. 1-156.
Altmayer, Christian, "Cycle Slip Detection and Correction by Means of Integrated Systems", ION Institute of Navigation, Pro-

(56) References Cited

OTHER PUBLICATIONS ceedings of the 200 National Technical Meeting of the Institute of Navigation, Abstract, Jan. 26-28, 2000.
Blanch, Juan, et al., "RAIM with Optimal Integrity and Continuity Allocations Under Multiple Failures", IEEE Transactions on Aerospace and Electronic Systems, vol. 46, No. 3, Jul. 2010.
Brack, A., "Optimal Estimation of a Subset of Integers With Application to GNSS", Artificial Satellites, vol. 51, No. 4—2016 DOI: 10.1515/arsa-2016-0011.
Brocard, Philippe, "Integrity monitoring for mobile users in urban environment", https://tel.archives-ouvertes.fr/el-01379632/document, submitted Oct. 11, 2016.
Bruno, Jon, et al., "A realistic simulation framework to evaluate ionospheric tomography", Advances in Space Research 65 (2020) 891-901.
Cassel, Ryan, "Real-Time ARAIM Using GPS, GLONASS, and GALILEO", Submitted in partial fulfillment of the requirements for the degree of Master of Science in Mechanical and Aerospace Engineering in the Graduate College of the Illinois Institute of Technology, May 2017.
Chiu, David S., et al., "Bierman-Thornton UD Filtering for Double-Differenced Carrier Phase Estimation Accounting for Full Mathematical Correlation", Jan. 2008, ION NTM 2008, pp. 756-762., Jun. 23, 2017 00:00:00.0.
Davidson, Pavel, et al., "Improved Vehicle Positioning in Urban Environment through Integration of GPS and Low-Cost Inertial Sensors", European Navigation Conference, ENC-GNSSAt: Naples, Italy, May 2009.
Drescher, Ralf, "Fast convergence of Trimble CenterPoint RTX by regional augmentation", Trimble Terrasat GmbJ, Munich, EGU General Assembly 2015, Vienna, Thursday, Apr. 16, 2015.
Favey, Etienne, et al., "Dead reckoning fills-in GPS navigation gap", EE Times, Automotive Designline, Aug. 18, 2011.
Feng, Shaun, et al., "Carrier phase-based integrity monitoring for high-accuracy positioning", GPS Solution, Apr. 2009.
Gratton, Livio, et al., "Carrier Phase Relative RAIM Algorithms and Protection Level Derivation", Journal of Navigation (2010), 63, 215-231, doi: 10.1017/S0373463309990403.
Gunning, Kazuma, et al., "Design and evaluation of integrity algorithms for PPP in kinematic applications", Proceedings of the 31st International Technical Meeting of the Satellite Division of The Institute of Navigation (ION GNSS+ 2018) Sep. 24-28, 2018, Hyatt Regency Miami, Miami, Florida.
Henkel, Patrick, et al., "Joint L-/C-Band Code and Carrier Phase Linear Combinations for Galileo", International Journal of Navigation and Observation, vol. 2008, Article ID 651437, 8 pages.
Hirokawa, Dr. Rui, "Recent Activity of International Standardization for High-Accuracy GNSS Correction Service", Mitsubishi Electric, Jun. 27, 2019.
Huang, Panpan, "Airborne GNSS PPP Based Pseudolite System", School of Civil and Environmental Engineering Faculty of Engineering UNSW. Jun. 2019.
Karaim, Malek, et al., "GNSS Error Sources", https://www.intechopen.com/books/multifunctional-operation-and-application-of-gps/gnss-error-sources, published Apr. 6, 2018.
Khanafseh, Samer, et al., "GNSS Multipath Error Modeling for Automotive Applications", Abstract only, Proceedings of the 31st International Technical Meeting of the Satellite Division of The Institute of Navigation (ION GNSS+ 2018), Miami, Florida, Sep. 2018, pp. 1573-1589, https://www.ion.org/publications/abstract.cfm?articleID=16107.
Kilic, Cagri, et al., "ZUPT Aided GNSS Factor Graph with Inertial Navigation Integration for Wheeled Robots", Proceedings of the 34th International Technical Meeting of the Satellite Division of The Institute of Navigation (ION GNSS+ 2021) Sep. 20-24, 2021.
Kissai, Ali, et al., "UAV Dead Reckoning with and without using INS/ GPS Integrated System in GPS denied Polar Region", International Journal of Aeronautics and Aerospace Engineering, ISSN: 2643-8224, 10 pages, published Aug. 26, 2019.
Ko, Jonathan, et al., "GP-UKF: Unscented kalman filters with Gaussian process prediction and observation models", Conference Paper, Dec. 2007, 10.1109/IROS.2007.4399284.
Kuusniemi, Heidi, et al., "GNSS Signal Reliability Testing in Urban and Indoor Environments", Proceedings of NTM 2004 Conference (Session A2), San Diego, CA, Jan. 26-28, 2004, The Institute of Navigation.
Lee, Jae Ho, et al., "A Two-antenna GPS Receiver Integrated with Dead Reckoning Sensors", ION Institute of Navigation, Proceedings of the IAIN Work Congress and the 56th Annual Meeting of the Institute of Navigation, Jun. 26-28, 2000, 4 pages.
Lei, Yu, et al., "Prediction of Navigation Satellite Clock Bias by Gaussian Process Regression", Lecture Notes in Electrical Engineering 342:411-423, Jan. 2015.
Li, T., et al., "Some remarks on GNSS integer ambiguity validation methods", Survey Review, Dec. 5, 2012, vol. 44, No. 326.
Lim, Cheol-Soon, et al., "Feasibility Study on Integration of SSR Correction into Network RTK to Provide More Robust Service", JPNT 7(4), 295-305 (2018).
Lin, Ming, et al., "Robust Gaussian Process Regression for Real-Time High Precision GPS Signal Enhancement", www.gps.gov/systems/gps/performance/accuracy, Jun. 5, 2019.
Liu, Haiying, et al., "A closed-loop EKF and multi-failure diagnosis approach for cooperative GNSS positioning", Engineering, GPS Solutions, Published 2015.
Madrid, Navarro, et al., "New Approach for Integrity Bounds Computation Applied to Advanced Precise Positioning Applications", Proceedings of the 28th International Technical Meeting of the Satellite Division of The Institute of Navigation (ION GNSS+ 2015) Sep. 14-18, 2015, Tampa Convention Center, Tampa, Florida.
Meng, Xiaoli, et al., "A Robust Vehicle Localization Approach Based on GNSS/IMU/DMI/LiDAR Sensor Fusion for Autonomous Vehicles", Sensors, 2017, 17, 2140.
Odijk, Dennis, et al., "On the estimability of parameters in undifferenced, uncombined GNSS network and PPP-RTK user models by means of S-system theory", Journal of Geodesy, Nov. 2015.
Peng, Hao, et al., "Covariance Fusion Strategy of Gaussian Processes Covariance and Orbital Prediction Uncertainty", Conference: AAS/AIAA Astrodynamics Specialist Conference, Portland, ME, Aug. 2019.
Pervan, Boris, et al., "Shaping Aviation Integrity Two RAIMs for Safety", GPS World The Business and Technology of Global Navigation and Positioning, Apr. 1, 2008.
Phelts, R. Eric, et al., "Innovation: Improving ARAIM, An approach using precise point positioning", GPS World, Jun. 13, 2020, https://www.gpsworld.com/innovation-improving-araim/.
Pullen, Sam, "Augmented GNSS: Fundamentals and Keys to Integrity and Continuity", Department of Aeronautics and Astronautics, Stanford University, Stanford, CA 94305-4035 USA, Tuesday, Sep. 20, 2011 1:30-5:00 PM Oregon Convention Center, Portland, Oregon.
Rasmussen, C.E., et al., "Gaussian Processes for Machine Learning", MIT Press, 2006, ISBN 026218253X. c 2006 Massachusetts Institute of Technology, (Year: 2006).
Rodriguez-Solano, Carlos, et al., "Protection Level of the Trimble RTX Positioning Engine for Autonomous Applications", Proceedings of the 34th International Technical Meeting of the Satellite Division of The Institute of Navigation (ION GNSS+ 2021), Sep. 20-24, 2021.
Rothacher, M., et al., "ANTEX: The Antenna Exchange Format, Version 1.4", Sep. 15, 2010, IGC International GNSS Service, https://kb.igs_org/hc/en-us/articles/216104678-ANTEX-format-description.
Satirapod, Chalermehon, "Improving the GPS Data Processing Algorithm for Precise Static Relative Positioning", School of Surveying and Spatial Information Systems The University of New South Wales. Jan. 2002.
Schmid, R., et al., "Estimation of elevation-dependent satellite antenna phase center variations of GPS satellites", Journal of Geodesy (2003) 77: 440-446, May 19, 2003, DOI 10.1007/s00190-003-0339-0.

(56) References Cited

OTHER PUBLICATIONS

Schmid, Ralf, et al., "From Relative Absolute Antenna Phase Center Corrections", Conference: IGS Workshop and Symposium 2004.

Schmid, Ralf, "How to Use IGS Antenna Phase Center Corrections", GPS World Tech Talk, Feb. 3, 2010.

Wang, Min, et al., "GPS Un-Differenced Ambiguity Resolution and Validation", Proceedings of the 19th International Technical Meeting of the Satellite Division of The Institute of Navigation (ION GNSS 2006), p. 292-300 (Year: 2006).

Kim, Donguk, et al., "Modified Kriging Based Double-Difference Tropospheric Correction Interpolation Method for Network RTK User", Proceedings of the 30th International Technical Meeting of the Satellite Division of The Institute of Navigation (ION GNSS+ 2017), Sep. 25-29, 2017, Oregon Convention Center. Portland, Oregon.

Li, Yihe, et al., "Improved PPP Ambiguity Resolution Considering the Stochastic Characteristics of Atmospheric Corrections from Regional Networks", Sensors 2015, 15, 29893-29909; doi:10.3390/s151229772, www.mdpi.com/journal/sensors, published Nov. 30, 2025.

Li, Xingxing, et al., "Real-time precise point positioning regional augmentation for large GPS reference networks", GPS Solut (2014) 18:61-71, published Jan. 24, 2013.

Sparks, Lawrence, et al., "Estimating ionospheric delay using kriging", Radio Science, vol. 46, RS0D21, doi:10.1029/2011RS004667, 2011, published Oct. 27, 2011.

Yang, Lei, et al., "Numerical weather modeling-based slant tropospheric delay estimation and its enhancement by GNSS data", Geo-spatial Information Science, 2013, vol. 16, No. 3, 186-200, http://dx.doi.org/10.1080/10095020.2013.817107, published Aug. 13, 2013.

\* cited by examiner

SYSTEMS AND METHODS FOR DISTRIBUTED DENSE NETWORK PROCESSING OF SATELLITE POSITIONING DATA

CROSS-REFERENCE TO RELATED APPLICATIONS

This application is a continuation of U.S. patent application Ser. No. 17/347,874 filed 15 Jun. 2021, which is a continuation of U.S. patent application Ser. No. 16/589,932, filed 1 Oct. 2019, which is a continuation of U.S. application patent application Ser. No. 16/195,427, filed on 19 Nov. 2018, now issued as U.S. Pat. No. 10,473,790, which claims the benefit of U.S. Provisional Application Ser. No. 62/587,741, filed on 17 Nov. 2017, all of which are incorporated in their entirety by this reference.

TECHNICAL FIELD

This invention relates generally to the satellite positioning field, and more specifically to new and useful systems and methods for distributed dense network processing of satellite positioning data.

BACKGROUND

Being able to perform high precision satellite positioning is important for a wide variety of applications. Unfortunately, current GPS solutions are often either inaccurate or require processor power beyond the capabilities of inexpensive hardware (either locally or in the cloud). A number of solutions have been proposed to address this problem, including Network Real Time Kinematic (Network RTK) satellite positioning. Unfortunately, in traditional methods of Network RTK, the input parameter space increases non-linearly with the size of the network, making it very computationally costly to increase the network size (and thus coverage area and/or positioning accuracy). Therefore, there is the need in the satellite positioning field to create systems and methods for distributed dense network processing of satellite positioning data. This invention provides such new and useful systems and methods.

DESCRIPTION OF THE INVENTION EMBODIMENTS

Figure 1:
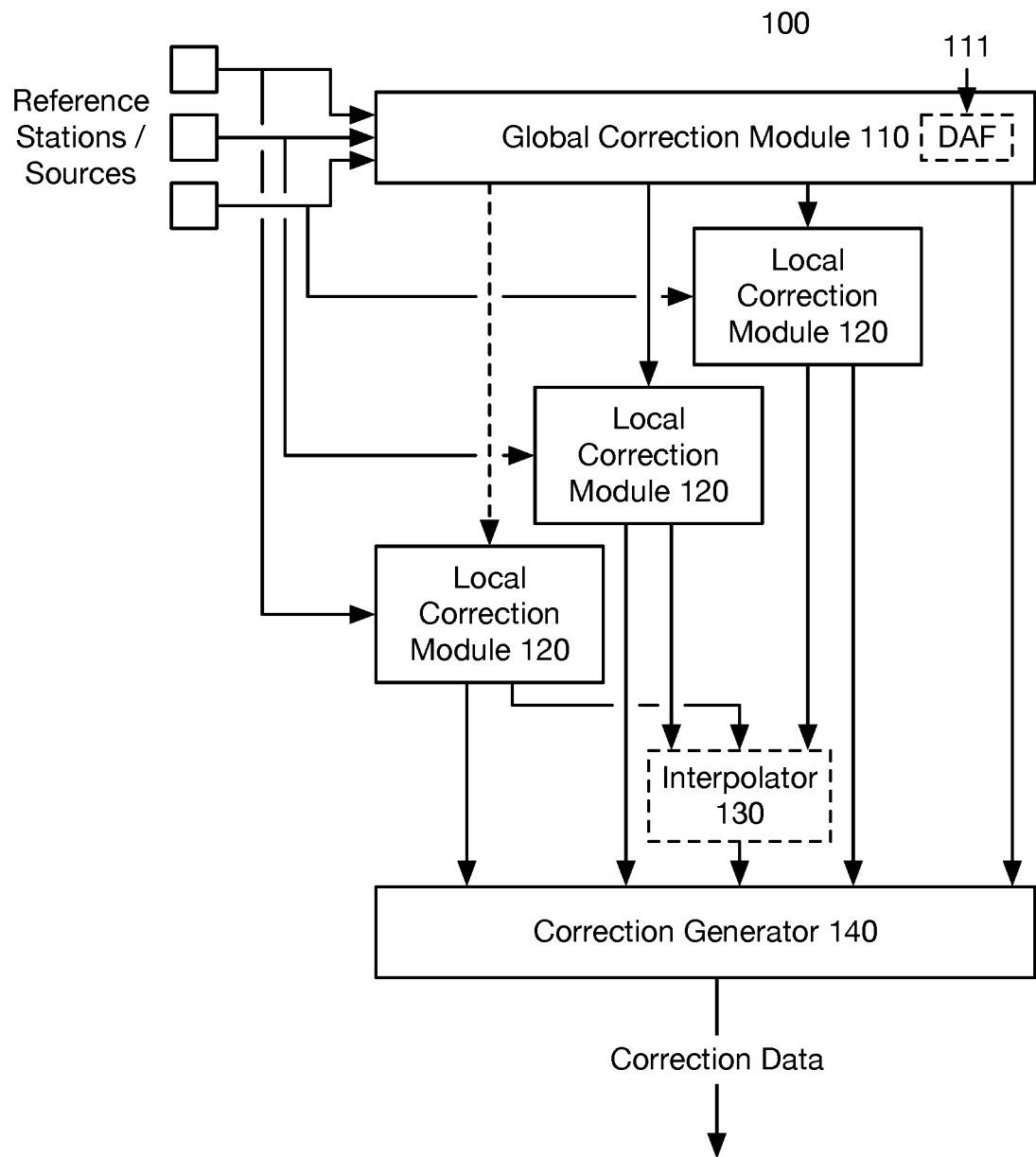
FIG. 1 is a diagram representation of a system of an invention embodiment.

The following description of the invention embodiments of the invention is not intended to limit the invention to these invention embodiments, but rather to enable any person skilled in the art to make and use this invention.

1. Traditional GNSS, PPP, and RTK

Traditional satellite positioning systems (e.g., standard GNSS) work by attempting to align a local copy (at a receiver) of a pseudorandom binary sequence with a satellite-transmitted copy of the same sequence; because the satellite is far from the receiver, the signal transmitted by the satellite is delayed. By delaying the local copy of the sequence to match up with the satellite-transmitted copy, the time it takes the signal to travel from the satellite to the receiver can be found, which can in turn be used to calculate the distance between the satellite and receiver. By performing this process for multiple satellites (typically four or more), a position of the receiver relative to the satellites can be found, which can in turn be used to find the position in a particular geographic coordinate system (e.g., latitude, longitude, and elevation). Typical GNSS systems can achieve at best 2 m accuracy in positioning.

For many applications (e.g., guidance for human-carrying autonomous vehicles/drones/agricultural equipment, GPS/GNSS research, surveying), this level of accuracy is woefully inadequate. In response, two position correction algorithms have been developed: precise point positioning (PPP) and real time kinematic (RTK).

Instead of solely using the positioning code broadcast by satellites, PPP and RTK also make use of satellite signal carrier phase to determine position. While much higher accuracy is possible using carrier phase data, accurately determining position of a mobile receiver (i.e., the receiver for which position is to be calculated) requires accounting for a number of potential sources of error. Further, carrier phase measurements are ambiguous; because the carrier signal is uniform, it may not be possible to differentiate between a phase shift of $\varphi$ and $2\pi N + \varphi$ using phase measurements alone, where N is an integer. For example, it may be difficult to determine the difference between a phase shift of $\pi$ radians and a phase shift of $3\pi$ radians (or $-\pi$, $5\pi$, etc.).

PPP attempts to solve this issue by explicitly modeling the error present in mobile receiver phase and code measurements. Some errors are global or nearly global (e.g., satellite orbit and clock errors); for these errors, PPP typically uses correction data with highly accurate measurements. However, for local errors (i.e., error that is substantially dependent on mobile receiver location), PPP is only capable of very rough modeling. Fortunately, many local errors change slowly in time; resultantly, PPP can achieve high accuracy with only a single receiver, but may require a long convergence time to precisely determine local errors. As the terms are used in the present application, "global error" refers to any error that does not vary substantially across multiple reference stations within a region, while "local error" refers to error that does vary substantially across multiple reference stations (because the error is specific to a reference station and/or because the error varies substantially over position within the region). As this error pertains to positioning, such errors may also be referred to as "global positioning error" and "local positioning error".

RTK avoids a large majority of the modeling present in PPP by use of GNSS reference stations (with precisely known locations); since a reference station is local to the mobile receiver, differencing the reference station and mobile receiver signals can result in greatly reduced error. The result is that RTK solutions can converge much more quickly than PPP solutions (and without the high accuracy global corrections data needed by PPP). However, RTK solutions require the presence of base stations near a mobile receiver.

2. System

A system 100 for distributed dense network processing of satellite positioning data includes a global correction module 110, a plurality of local correction modules 120, and a correction generator 140, as shown in FIG. 1. The system 100 may additionally include one or more interpolators 130.

Note that the inter-module connections as shown in FIG. 1 are intended as non-limiting examples, and the components of the system 100 may be coupled in any manner. For example, data from the global correction module 110 may be used to initialize local correction modules 120, may be passed to the correction generator 140 via local correction modules 120, may be passed directly to the correction generator 140, and/or may be utilized by the system 100 in any other manner.

The system 100 functions to generate correction data to be used by a mobile GNSS (Global Navigation Satellite System) receiver or any other GNSS receiver for which position/velocity/timing data correction is desired. Such a receiver (henceforth referred to as a mobile receiver) may operate on any satellite navigation system; e.g., GPS, GLONASS, Galileo, and Beidou. The correction data is preferably used to improve GNSS solution accuracy, and may take the form of PPP corrections, RTK corrections, or any other type of corrections (discussed in the section on the correction generator 140.

Flexibility in the form of corrections data is an inherent and distinguishing aspect of the system 100 over traditional position correction systems. Rather than attempting to generate corrections solely from a small set of high-quality global reference stations (as in PPP) or by comparing data in mobile receiver/reference station pairs (as in RTK), the system 100 collects data from reference stations (and/or other reference sources), and instead of (or in addition to) applying this data directly to generate connections, the data is used to generate both a global correction model (in the global correction module 110) and a number of local correction models (in local correction modules 120). Output of these models are then passed to the correction generator 140, which can use said output to generate correction data in any form. Further, the correction generator 140 may cache and/or (with use of the interpolator 130 spatially interpolate corrections data to provide high quality corrections to mobile receivers regardless of correction capability (e.g., whether the receiver can process RTK/PPP corrections) and location of individual base stations.

By operating in this manner, the system 100 may provide a set of corrections that (while usable with PPP receivers) suffers from little of PPP's long convergence time issues, with solution complexity scaling directly with the number of reference stations N (unlike RTK, in which solution complexity scales at least with the number of possible pairs; i.e., $N^2$. In fact, many current solutions scale with $N^3$ or worse). Further, since corrections are preferably calculated using local correction models that may depend on any number of single reference stations (rather than specific reference station pairs), corrections are substantially more robust to loss of a base station.

Further, the flexible nature of the system 100 enables some functions (such as spatial interpolation and caching) to be performed much more generally than would be possible with RTK; while the concept of a "virtual reference station" is known within RTK (also referred to as a "pseudo reference station"), virtual reference stations typically involve the interpolation of RTK corrections data in real time (and, as discussed before, error correction scales in complexity with $N^2$). In contrast, interpolation in the system 100 can be limited to specific aspects of global and/or local corrections models, providing more robustness to error and better insight as to error causes. Further, unlike RTK, which requires real-time corrections data, the model-based system 100 may cache or otherwise retain model parameters even when data is limited (e.g., when a reference station suddenly becomes unavailable).

The system 100 is preferably implemented in software as part of a networked distributed computing system, but may additionally or alternatively be implemented in any manner.

The global correction module 110 functions to maintain one or more global correction models. Global correction models preferably accomplish two functions—correcting for global error (i.e., error in GNSS positioning that does not vary substantially in space) and error-checking/seeding local error estimates (where local error refers to error that does vary substantially in space or per GNSS receiver). Note that seeding here refers to providing a coarse estimate as a starting point for further refinement.

The global correction module 110 preferably takes as input raw data from reference stations and the mobile receiver (e.g., carrier phase data, pseudorange data, reference station location etc.) but may additionally or alternatively take in processed data from reference stations and/or the mobile receiver (e.g., positioning code data) or data from any other source (e.g., PPP global corrections data sources on the internet, calibration data for particular satellites or receiver types from a manufacturer or other source, satellite orbit data, satellite clock data).

The reference stations utilized by the system 100 are preferably public reference stations, but may additionally or alternatively be private reference stations or any other suitable reference stations.

Reference stations preferably have a location known to a high degree of accuracy. Reference station location is preferably the location of the antenna used to receive satellite signals. Reference station location may be determined in any manner yielding a high degree of accuracy; for example, reference station location may be determined by a number of receivers set around the reference station at vertical and horizontal reference points. Note that while reference stations are preferably fixed in location, they may additionally or alternatively be mobile. Station position is preferably re-determined to high accuracy before moved reference stations re-start providing phase data; additionally or alternatively, reference stations may provide phase data before location re-determination (for example, for use in attitude estimation; alternatively, data may be provided but not used). As another alternative, reference stations may not provide absolute location data at all if not needed; for example, absolute location data of the reference station may not be needed for applications including attitude estimation. Note that fixed reference stations may, over time, "self-survey" their own positions to a reasonably high degree of accuracy.

Reference stations preferably provide phase data for multiple satellite signals and the location of the reference station via the internet, but may additionally or alternatively provide data by any other suitable method (e.g., transmission by UHF-band radio modem). Reference station data is preferably made available directly to the system 100, but may additionally or alternatively be processed or aggregated before being made available to the system 100.

Reference stations preferably have one or more satellite receivers and generate corrections based on those receivers. The number and quality of satellite receivers used by a reference station (or other factors, like antenna type/size/location) may determine the accuracy of reference station data. Reference stations (or other sources of reference station data; e.g., a reference source that creates correction data from multiple reference stations) may be ordered or grouped by reference station quality (e.g., accuracy of corrections) and/or locality (e.g., if corrections are desired for a particular mobile receiver, reference stations may be ordered or grouped by distance to that receiver).

The global correction module 110 preferably explicitly models the effects of global parameters on GNSS navigation. These parameters preferably include satellite clock error, satellite orbit error, satellite hardware bias, satellite antenna phase windup, phase center offset (PCO), and phase center variation (PCV) (all of which are per satellite, but generally do not vary spatially), solid earth tides, solid earth pole tides, ocean tidal loading (which vary spatially and temporally, but in a predictable manner), as well as coarse global models of ionospheric and tropospheric effects (in this case, global models may not be accurate enough by themselves to model ionospheric and tropospheric effects, but they provide a starting point for later refinement). Additionally or alternatively, the global correction module 110 may model the effects of any parameters on GNSS signals as received by a mobile receiver or a reference station. The global correction module 110 preferably additionally maintains uncertainty estimates for at least some global parameters; additionally or alternatively, the global correction module 110 may not maintain uncertainty estimates.

Note that for receivers used in generating/updating the global model, the global correction module 110 may additionally or alternatively model effects unique to those receivers; e.g., receiver clock error, receiver hardware bias, and receiver antenna phase windup/PCO/PCV (which are unique to a given receiver but not directly dependent on location).

The plurality of local correction modules 120 function to maintain local correction models. Local correction models preferably correct for spatially local variance of effects on GNSS signals as well as for effects that are specific to particular receivers/reference stations.

Local correction modules 120 preferably correspond to (and receive data from) a single reference station. In some embodiments, a local correction module 120 exists for each reference source or station, such that each local correction module 120 takes input from a unique reference source. Additionally or alternatively, local correction modules 120 may correspond to and/or couple to reference stations in any manner; for example, a local correction module 120 may be used to model a number of reference stations within a particular spatial region. Additionally or alternatively, the system 100 may include one or more local correction modules 120 corresponding to mobile receivers.

A local correction module 120 preferably takes as input raw data from corresponding reference stations/mobile receivers (e.g., carrier phase data, positioning code data, reference station location, pseudorange, navigation data, message data, etc.) but may additionally or alternatively take in processed data from reference stations and/or the mobile receiver (e.g., broadcast ephemerides and almanacs) or data from any other source. The local correction module 120 preferably additionally takes data from the global correction module 120 (e.g., to initialize a local correction model for a new reference station and/or to compensate for global components of local error). Additionally or alternatively, the local correction module 120 may take data from any source (e.g., the local correction module 120 may take in only reference data and not any output of the global correction module 110).

The local correction module 120 preferably explicitly models the effects of local parameters on GNSS navigation. These parameters preferably include tropospheric and ionospheric effects (which are not directly dependent on reference station but vary spatially/temporally), receiver clock error, receiver hardware bias, receiver antenna phase windup/PCO/PCV (which are unique to a given receiver/antenna but not directly dependent on location), carrier phase ambiguity, and other position error (which covers effects not otherwise explicitly modeled). Additionally or alternatively, the local correction module 120 may model the effects of any parameters on GNSS signals as received by a mobile receiver or a reference station. Like the global correction module 110, the local correction module 120 may additionally or alternatively maintain/track parameter uncertainty estimates.

In particular, the local correction module 120 preferably models tropospheric and ionospheric effects as a function of receiver position.

Figure 2A:
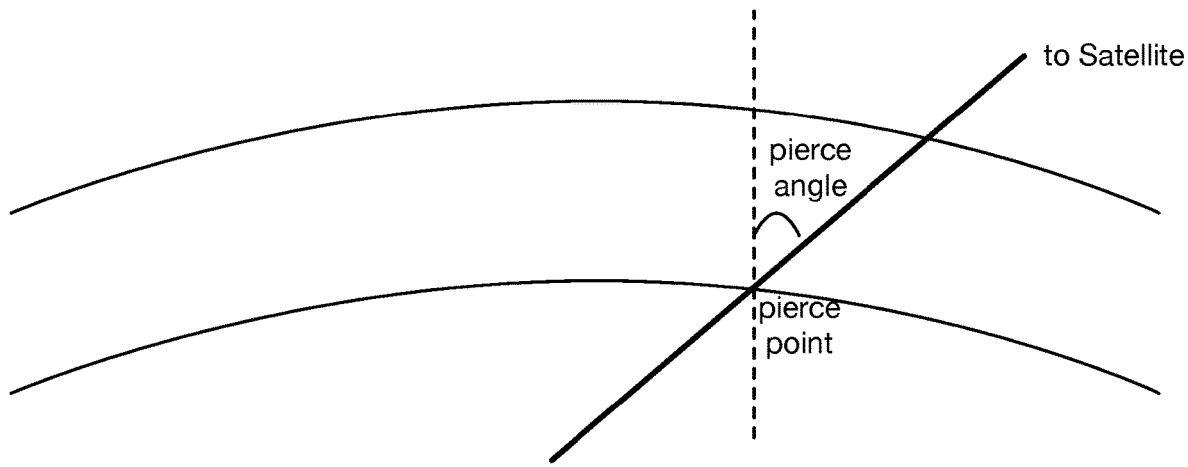
FIGS. 2A and 2B are example representations of ionospheric effect modeling.
Figure 2B:
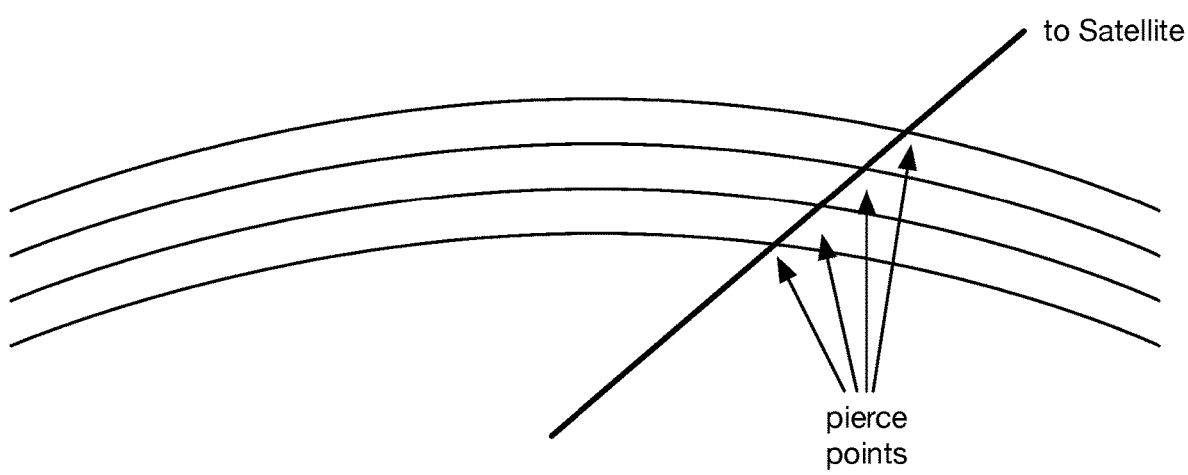
Figure 3:
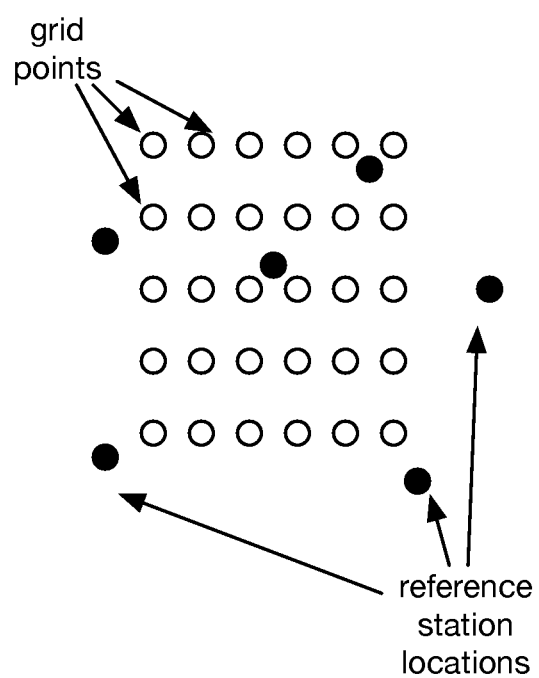
FIG. 3 is an example representation of GNSS effect interpolation.

Ionospheric effects may be difficult to model. It is difficult to differentiate the effects on GNSS signals of ionospheric effects from those of receiver hardware bias; however, ionospheric effects tend to vary more quickly in time than receiver hardware bias. Accordingly, local correction modules 120 may attempt to separate ionospheric effects and effects of hardware bias based on rate of change of the combination of these effects. Further, ionospheric effects vary significantly (and not in an easily predictable manner) based not only on position, but also based on the path a GNSS signal takes through the ionosphere. Accordingly, a model of ionospheric effects may need to take each of these factors into account. In one implementation of an invention embodiment, local correction modules 120 model ionospheric effects per GNSS source (e.g., per satellite) as a function of both position (e.g., pierce point—where the line of sight between a receiver and a satellite intersects the atmospheric layer) and pierce angle (e.g., as an analogue for the signal path), as shown in FIG. 2A. Ionospheric effect may also be modeled with respect to frequency. Further, the ionosphere is preferably modeled as one or more thin shells; however, the ionosphere may be additionally or alternatively modeled in any manner. Likewise, ionospheric effects may be modeled in any manner; as opposed to modeling ionospheric effects as a function of position and angle, ionospheric effects may be modeled based on the set of pierce positions for each shell of the ionospheric model, as shown in FIG. 2B.

In contrast, tropospheric effects are not substantially variant in frequency (for most satellite frequencies); further, while tropospheric effects do depend on angle, they typically do so in a predictable manner. Accordingly, local correction models preferably model tropospheric effects solely based on position (e.g., pierce point) with a static correction for angle (roughly corresponding to $1/\cos\theta$ where $\theta$ is the angle from vertical). Additionally or alternatively, tropospheric effects may be modeled in any manner.

Models of the global correction module 110 and local correction modules 120 are preferably weakly coupled; that is, changes in model in either case propagate to each other, but in a damped manner (which allows for reaction to changing conditions without bad data or reference station loss causing correction accuracy to break down). Additionally or alternatively, the models may be coupled in any manner (or not at all).

Models of the global correction module 110 and local correction modules 120 are preferably maintained/updated via a Kalman filter or Gaussian process, but may additionally or alternatively be maintained/updated in any manner.

The global correction module 110 and local correction modules 120 may use any set(s) of reference sources. For example, the local correction modules 120 may use a strict subset of reference sources used by the global correction module 110 (e.g., the subset of reference sources within a range threshold of a mobile receiver), or the global correction module 110 may use a strict subset of reference sources used by the local correction modules 120 (e.g., the subset of local reference sources with highest accuracy). As a second example, the local correction modules 120 and global correction module 110 may use overlapping reference sources (but neither set a subset of the other). As a third example, the local correction modules 120 and global correction module 110 may use non-overlapping sets of reference sources (i.e., they do not share a reference source). Likewise, these reference sources may receive satellite information from any set(s) of satellites.

The output of the global correction module 110 and local correction modules 120 may be referred to as "pre-corrections" and may be generated in any form usable by the correction generator 140 to generate correction data. Pre-corrections generated by the global correction module 110 may be referred to as "global pre-corrections", while pre-corrections generated by a local correction module 120 may be referred to as "local pre-corrections".

In a variation of an invention embodiment, the global correction module 110 includes a differenced ambiguity fixer (DAF) 111 that calculates carrier phase ambiguity for some reference station pairs. This differenced ambiguity fixer may be used, for instance, to help initialize new reference stations in global and local models more rapidly. Alternatively, the DAF 111 may be independent of the global correction module 110.

The interpolator 130 functions to interpolate spatially variant effects of the system 100. In particular, the interpolator 130 preferably functions to transform per reference station models of local tropospheric and ionospheric effects into a local (reference-station independent, but position dependent) model of local tropospheric and ionospheric effects. For example, the interpolator 130 may transform a set of tropospheric effect models corresponding to individual reference locations (each having a known position) to a regularly spaced grid. Additionally or alternatively, the interpolator 130 may function in any manner (e.g., by creating a continuous interpolated model of tropospheric/ionospheric effects rather than a discrete grid, or using some other arrangement of discrete points than a grid pattern). Note that any interpolation technique may be used; for example, kriging may be used (this technique has the advantage of also predicting uncertainty at the interpolated points). In general, the local position dependent model may be referred to as a "unified position-based model" (since it unifies the output of multiple models corresponding to individual reference sources).

The interpolator 130 may additionally or alternatively function to separate ionospheric effects and effects of hardware bias; for example, local correction modules 120 may output to the interpolator 130 both ionospheric and hardware bias estimates (optionally including a term characterizing the correlation between these estimates), and from these estimates attempt to fit a unified (spatially variant) ionospheric model to the data (after which hardware bias estimates for each reference source may be refined). For example, each local correction module 120 ($LCM_i$) may output an ionospheric correction $I_i(x, y, z)$ and a hardware bias correction $H_i$. At the local correction module 120 these corrections may be improperly separated; e.g., $I_i=I_i(ideal)+\Delta_i$, $H_i=H_i(ideal)-\Delta_i$, but because the ionospheric estimates should fit the same model, the interpolator 130 can use measurements from multiple reference sources to refine estimates of both ionospheric correction and hardware bias correction.

The correction generator 140 functions to generate corrections to be used by the mobile receiver. The correction generator 140 preferably generates corrections based on output of the global correction module 110 and the local correction modules 120 for a mobile receiver in a form usable by the mobile receiver. For example, if the mobile receiver can accept PPP corrections, the correction generator 140 may send corrections in the form of PPP corrections (though, in contrast to true PPP corrections, the corrections generated by the correction generator 140 may depend upon receiver position estimate or another spatial term). Additionally or alternatively, the correction generator 140 may send corrections in the form of RTK corrections (e.g., of a virtual reference station), or in any other form (e.g., some sort of local coefficients that are part of a local model). Note that local and global corrections may happen in any order (and may be synchronous or asynchronous). The correction generator 140 may additionally or alternatively send or use correction data in any manner to correct position data (e.g., the correction generator 140 may take as input position data and generate corrected position data rather than a positioning correction to be implemented by, say, a mobile receiver).

The correction generator 140 preferably caches model output and generates corrections using this cache. Accordingly, in the absence of some real-time data, cached data may be substituted (not possible in traditional RTK). Additionally or alternatively, new parameters may be estimated based on a predicted variation in time (e.g., predicted from cached values), or the correction generator 140 may not rely on cached and/or predicted outputs.

The correction generator 140 may additionally or alternatively calculate estimated uncertainty in the generated corrections given uncertainty in the input parameters (traditional PPP/RTK solutions are not capable of doing this).

2. Method

Figure 4:
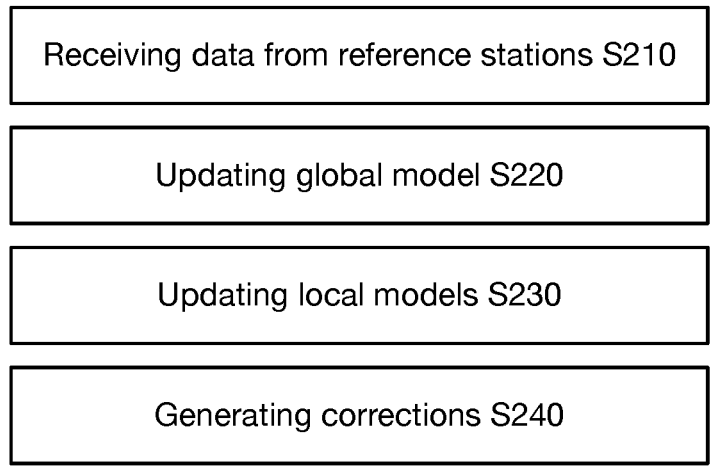
FIG. 4 is a chart representation of a method of an invention embodiment.

A method 200 for distributed dense network processing of satellite positioning data includes receiving data from a set of reference stations S210, updating a global GNSS correction model S220, updating a set of local GNSS correction models S230, and generating GNSS corrections S240, as shown in FIG. 4.

The method 200 preferably functions in a substantially similar manner to the system 100.

Receiving data from a set of reference stations S210 functions to receive input data used to update global and local GNSS correction models, substantially similar to as described in the system 100.

Updating a global GNSS correction model S220 functions to update a global correction model substantially similar to that of the global correction module 110; this model preferably accomplishes two functions—correcting for global error (i.e., error in GNSS positioning that does not vary substantially in space) and error-checking/seeding local error estimates. Updates are preferably performed as described in the system 100 description.

Updating a set of local GNSS correction models S230 functions to update local correction models substantially similar to that of the local correction module 120; these models preferably correct for spatially local variance of effects on GNSS signals as well as for effects that are specific to particular receivers/reference stations. Updates are preferably performed as described in the system 100 description.

Generating GNSS corrections S240 functions to generate corrections from global and local correction models to be used by a mobile receiver. Generating GNSS corrections preferably includes generating corrections as described in the sections on the correction generator 140; additionally or alternatively, as part of this generation process, S240 may include performing interpolation (as described in the section on the interpolator 130). Likewise, S240 may include caching model output and generating corrections from this cache. Accordingly, in the absence of some real-time data, cached data may be substituted (this is not possible in traditional RTK).

The method 200 is preferably implemented by the system 100 but may additionally or alternatively be implemented by any system for distributed dense network processing of satellite position data.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for distributed dense network processing of satellite position data. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for generating global navigation satellite systems (GNSS) corrections comprising:
   receiving, at a cloud computing server:
      a first set of satellite observations comprising at least one of code data or carrier phase data for each of a first set of satellites that are tracked by a first set of reference stations; and
      a second set of satellite observations comprising at least one of code data or carrier phase data for each of a second set of satellites that are tracked by a second set of reference stations;
   determining spatially-invariant corrections based on the first set of satellite observations using a spatially-invariant model, wherein the spatially-invariant corrections comprises at least one of corrections for satellite clock error, satellite orbit error, satellite hardware bias, phase center offset (PCO), and phase center variation (PCV) for each of a third set of satellites; wherein satellite signals from the third set of satellites are corrected using the GNSS corrections and used to determine a position of a mobile GNSS receiver; wherein the spatially-invariant corrections comprise a correction for at least one of solid earth tides, solid earth pole tides, and ocean tidal loading corresponding to a given time and spatial region; wherein the position of the GNSS receiver is calculated for the given time and spatial region;
   determining a spatially-variant precorrection for each spatial region associated with a separate reference station of the second set of reference stations;
   determining a spatially-variant corrections from the spatially-variant precorrections; and
   combining the spatially-invariant corrections and the spatially-variant corrections to determine the GNSS corrections.

2. The method of claim 1, wherein determining the spatially-variant corrections comprises transforming the spatially-variant precorrection for each spatial region into spatially-variant corrections associated with discrete points.

3. The method of claim 2, wherein the discrete points are different from a location of reference stations of the second set of reference stations.

4. The method of claim 2, wherein determining the spatially-variant corrections comprises interpolating the spatially-variant precorrections using kriging to determine an uncertainty for the spatially-variant corrections associated with the discrete points.

5. The method of claim 1, wherein determining the spatially-invariant corrections further comprises determining an uncertainty estimate for the spatially-invariant corrections based on uncertainties in the first set of satellite observations.

6. The method of claim 1, wherein determining the spatially-variant corrections from the spatially-variant precorrections comprises:
   receiving at least one of hardware bias effect data, atmospheric effect data, or correlations therebetween; and
   refining the spatially-variant corrections based on the at least one of hardware bias effect data, the atmospheric effect data, or the correlations therebetween.

7. A method comprising:
   receiving at a cloud computing server a first set of satellite signals comprising at least one of positioning code data and carrier phase data from a first set of reference sources, wherein the positioning code data and carrier phase data from the first set of reference sources results from the reception of satellite signals from a first set of satellites at the first set of reference sources;
   determining an atmospheric precorrection for each reference source of the first set of reference source by modelling the atmosphere as a function of pierce point for each reference source using a shell model for the atmosphere, wherein the pierce point is a point along the line-of-sight vector between the respective reference source and satellite that the line-of-sight vector intersects a shell of the shell model;
   transforming the atmospheric precorrections at each reference station location of the first set of reference stations to a reference station independent atmospheric model; and
   generating a positioning correction for a mobile receiver based on the atmospheric precorrections.

8. The method of claim 7, wherein the atmospheric precorrection for each reference source comprises an ionospheric delay and a tropospheric delay.

9. The method of claim 8, wherein the ionospheric delay for a respective reference source is further modelled as a function of pierce angle for the respective reference source and a satellite signal frequency, wherein the tropospheric delay is further modelled with a static correction for angle.

10. The method of claim 7, wherein the shell model comprises more than one shell.

11. The method of claim 7, wherein the reference station independent atmospheric model comprises a continuous atmospheric model and a discrete atmospheric model.

12. The method of claim 11, wherein the discrete atmospheric model comprises a regularly spaced grid of atmospheric corrections, wherein grid points of the regularly spaced grid do not correspond to reference station locations of the first set of reference stations.

13. The method of claim 7, wherein transforming the comprises atmospheric precorrections at each reference station location of the first set of reference stations interpolating the atmospheric precorrections using kriging and determining an uncertainty for the atmospheric precorrections.

14. The method of claim 7, further comprising:
receiving at the cloud computing server a second set of satellite signals comprising at least one of positioning code data and carrier phase data from a second set of reference sources, wherein the positioning code data and carrier phase data from the second set of reference sources results from the reception of satellite signals from a second set of satellites at the second set of reference sources; and
determining spatially-invariant precorrections using the second set of satellite signals;
wherein the positioning correction is further generated using the spatially-invariant precorrections.

15. The method of claim 14, wherein the spatially-invariant precorrections comprise a course atmospheric model, wherein determining the atmospheric precorrections comprises refining the course atmospheric model.

16. The method of claim 14, wherein the spatially-invariant precorrections comprise at least one of corrections for satellite clock error, satellite orbit error, satellite hardware bias, satellite phase center offset (PCO), satellite phase center variation (PCV), solid earth tides corresponding to a given time and spatial region, solid earth pole tides corresponding to a given time and spatial region, and ocean tidal loading corresponding to a given time and spatial region; wherein a position of the GNSS receiver is calculated for the given time and spatial region based on satellite signals received by the GNSS receiver and corrected using the positioning correction.

17. The method of claim 7, wherein the atmospheric precorrections are updated using a Gaussian process.

18. A method comprising:
receiving at a cloud computing server a first set of satellite signals comprising at least one of positioning code data and carrier phase data from a first set of reference sources, wherein the positioning code data and carrier phase data from the first set of reference sources results from the reception of satellite signals from a first set of satellites at the first set of reference sources;
determining an atmospheric precorrection for each reference source of the first set of reference source by modelling the atmosphere as a function of pierce point for each reference source using a shell model for the atmosphere, wherein the pierce point is a point along the line-of-sight vector between the respective reference source and satellite that the line-of-sight vector intersects a shell of the shell model;
receiving at the cloud computing server a second set of satellite signals comprising at least one of positioning code data and carrier phase data from a second set of reference sources, wherein the positioning code data and carrier phase data from the second set of reference sources results from the reception of satellite signals from a second set of satellites at the second set of reference sources; and
determining spatially-invariant precorrections using the second set of satellite signals;
generating a positioning correction for a mobile receiver based on the atmospheric precorrections and the spatially-invariant precorrections.

19. The method of claim 18, wherein the spatially-invariant precorrections comprise a course atmospheric model, wherein determining the atmospheric precorrections comprises refining the course atmospheric model.

20. The method of claim 18, wherein the spatially-invariant precorrections comprise at least one of corrections for satellite clock error, satellite orbit error, satellite hardware bias, satellite phase center offset (PCO), satellite phase center variation (PCV), solid earth tides corresponding to a given time and spatial region, solid earth pole tides corresponding to a given time and spatial region, and ocean tidal loading corresponding to a given time and spatial region; wherein a position of the GNSS receiver is calculated for the given time and spatial region based on satellite signals received by the GNSS receiver and corrected using the positioning correction.

21. The method of claim 18, wherein the atmospheric precorrections are updated using a Gaussian process.

22. The method of claim 18, wherein the atmospheric precorrection for each reference source comprises an ionospheric delay and a tropospheric delay.

23. The method of claim 22, wherein the ionospheric delay for a respective reference source is further modelled as a function of pierce angle for the respective reference source and a satellite signal frequency, wherein the tropospheric delay is further modelled with a static correction for angle.

24. The method of claim 18, wherein the shell model comprises more than one shell.

* * * * *